United States Patent
Bavykina et al.

(10) Patent No.: US 12,227,451 B2
(45) Date of Patent: Feb. 18, 2025

(54) SAND TREATMENT METHOD AND SYSTEM FOR CONCRETE APPLICATIONS

(71) Applicant: KING ABDULLAH UNIVERSITY OF SCIENCE AND TECHNOLOGY, Thuwal (SA)

(72) Inventors: Anastasiya Bavykina, Thuwal (SA); Juan Manuel Colom, Thuwal (SA); Jorge Gascon, Thuwal (SA); William McDonough, Charlottesville, VA (US)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/781,276

(22) Filed: Jul. 23, 2024

(65) Prior Publication Data

US 2024/0376002 A1   Nov. 14, 2024

Related U.S. Application Data

(63) Continuation of application No. PCT/IB2023/058781, filed on Sep. 5, 2023.
(Continued)

(51) Int. Cl.
*C04B 14/06* (2006.01)
*C04B 14/28* (2006.01)
(Continued)

(52) U.S. Cl.
CPC ............ *C04B 14/068* (2013.01); *C04B 14/28* (2013.01); *C04B 20/023* (2013.01); *C04B 40/0231* (2013.01)

(58) Field of Classification Search
None
See application file for complete search history.

(56) References Cited

U.S. PATENT DOCUMENTS

| 7,753,618 B2 | 7/2010 | Constantz et al. |
| 2010/0024686 A1* | 2/2010 | Constantz ............... C01F 11/18 |
| | | 423/430 |

FOREIGN PATENT DOCUMENTS

| DE | 2826956 A1 | 1/1980 |
| DE | 102015114554 A1 | 3/2017 |
| DE | 102017006720 | 6/2018 |

OTHER PUBLICATIONS

Hossen, S.K.B., et al., "Elemental Testing of Carbonated Silty Sand Treated with Lime," Feb. 21, 2020, Geo-Congress 2020: Foundations, Soil Improvement, and Erosion (GSP 315), pp. 562-571.
(Continued)

*Primary Examiner* — Ronak C Patel
(74) *Attorney, Agent, or Firm* — PATENT PORTFOLIO BUILDERS PLLC

(57) ABSTRACT

A sand aggregate includes plural aggregate grains, wherein at least one aggregate grain of the plural aggregate grains includes, desert sand grains that are too small to be used in concrete applications, carbonate particles distributed on an external surface of the desert sand grains, and a sand-based glue that aggregates the desert sand grains together. The at least one aggregate grain has a size comparable to river sand grains, while the desert sand grains have a size smaller than the river sand grains so that the at least one aggregate grain is suitable for concrete applications.

24 Claims, 13 Drawing Sheets

Related U.S. Application Data

(60) Provisional application No. 63/412,650, filed on Oct. 3, 2022.

(51) Int. Cl.
    *C04B 20/02*     (2006.01)
    *C04B 40/02*     (2006.01)

(56) References Cited

OTHER PUBLICATIONS

International Search Report in corresponding/related International Application No. PCT/IB2023/058781, date of mailing Nov. 7, 2023.

Liu, X., et al., "A Quantitative Evaluation of Size and Shape Characteristics for Desert Sand Particles," May 5, 2022, Minerals, vol. 12, No. 581, pp. 1-14.

Pan, G., et al., "Effect of DO2 Curing on Demolition Recycled Fine Aggregates Enhanced by Calcium Hydroxide Pre-Soaking," Construction and Building Materials, Aug. 17, 2017, vol. 154, pp. 810-818.

Written Opinion of the International Searching Authority in corresponding/related International Application No. PCT/IB2023/058781, date of mailing Nov. 7, 2023.

\* cited by examiner

EI=0.96
FI=0.86
VESD=74.52 μm

EI=0.98
FI=0.57
VESD=84.28 μm

EI=0.62
FI=0.98
VESD=79.16 μm

EI=0.66
FI=0.43
VESD=122.31 μm

| Exp. | Sand type | Sand/Ca(OH)$_2$ (m/m) | N$_2$ (NmL/min) | CO$_2$ (NmL/min) | H$_2$O | Reaction time (h) | Sample IN (mg) | Sample OUT (mg) | Weight increase (%) | Ca(OH)$_2$ reacted * |
|---|---|---|---|---|---|---|---|---|---|---|
| 1 | South Beach | 5/1 | 4 | 4 | yes | 23 | 2760 | 3008 | 9.0% | 90.2% |
| 2 | South Beach | 5/1 | 4 | 4 | no | 23 | 2780 | 2780 | 0.0% | 0.0% |
| 3 | Thuwal | 5/1 | 4 | 4 | yes | 23 | 3009 | 3256 | 8.2% | 83% |
| 4 | South Beach | 5/1 | 8 | - | yes | 23 | 2766 | 2876 | 4.0% | 0% |
| 5 | South Beach | 5/1 | 4 | 4 | yes | 4 | 2766 | 3014 | 9.0% | 90.6% |
| 6 | Thuwal | 5/1 | 4 | 4 | yes | 4 | 2761 | 2964 | 7.4% | 74.3% |
| 7 | South Beach | 3/1 | 4 | 4 | yes | 4 | 2760 | 3164 | 14.6% | 98.6% |
| 8 | South Beach | 7/1 | 4 | 4 | yes | 4 | 2760 | 2949 | 6.8% | 92% |

FIG. 9

| Exp. | Sand type | Sand/Ca(OH)$_2$ (m/m) | Reaction time (h) | Sample IN (mg) | Sample OUT (mg) | Weight increase (%) | Ca(OH)$_2$ reacted* |
|---|---|---|---|---|---|---|---|
| 1 | Thuwal | Only Sand | 23 | 3000 | 2985 | -0.5% | 0 |
| 2 | Thuwal | 5/1 | 23 | 3000 | 3046 | 1.5% | 15% |

FIG. 11

SAND TREATMENT METHOD AND SYSTEM FOR CONCRETE APPLICATIONS

CROSS-REFERENCE TO RELATED APPLICATIONS

This application is a Continuation Utility Application of International Application No. PCT/IB2023/058781, filed on Sep. 5, 2023, which claims priority and benefit to U.S. Provisional Patent Application No. 63/412,650, filed on Oct. 3, 2022, entitled "DESERT SAND TREATMENT FOR ITS UTILIZATION IN CONCRETE MANUFACTURING," the disclosures of which are incorporated herein by reference in their entirety.

BACKGROUND OF THE INVENTION

Technical Field

Embodiments of the subject matter disclosed herein generally relate to a system and method for transforming a sand, which is not appropriate for concrete applications (non-conforming sand), into an aggregate (composition) that is appropriate for concrete applications, and more particularly, to modifying the shape and/or size of the non-conforming sand so that it becomes conforming.

Discussion of the Background

Concrete is an important building material that is widely used by the modern civilization, but its production requires large amounts of natural resources, particularly sand and cement. In addition, the process of manufacturing cement is very energy intensive, and generates a large amount of carbon dioxide ($CO_2$). In the face of increasing climate change concerns due especially to the $CO_2$ emissions, carbon capture and storage (CCS) has emerged as a strategy for curbing greenhouse gas emissions and mitigate the adverse impacts of global warming. As human activities continue to release excessive $CO_2$ amounts into the atmosphere, finding effective and sustainable ways to capture and store this $CO_2$ has become a pressing problem.

Various research groups have tried to solve each of these problems individually. For example, with regard to the concrete problem, traditional concrete manufacturing relies on riverbed and coastal sands (called herein "river sand"), leading to concerns over environmental degradation and resource depletion. One potential solution lies in transforming the desert sand or other fine sands, which are abundant but currently unsuitable for concrete production, into a valuable construction resource. In this regard, desert sand is a largely untapped resource that covers vast expanses of the Earth's surface. Unlike the river sand used in traditional concrete production, desert sand is readily available in regions with arid climates. Utilizing desert sand in concrete production can contribute to sustainable resource management as traditional sand mining can lead to erosion, habitat destruction, and disruption of local ecosystems. By transitioning to desert sand or other fine sands, it would be possible to alleviate these concerns, allowing natural river and coastal environments to recover and thrive. This shift would promote responsible land use and contribute to the conservation of valuable ecosystems.

Researchers and engineers are constantly exploring innovative methods to refine desert sand for concrete production. Advanced processing techniques, such as selective sifting, washing, and grading, can modify the properties of desert sand to meet the requirements of concrete production. These technological advancements offer the potential to convert desert sand into a valuable construction resource, while maintaining the integrity and durability of concrete structures. However, currently none of these methods are economically and industrially suitable technologies for achieving this goal.

With regard to mitigating the climate change issue, as the excessive $CO_2$ emissions are a key driver of global warming, leading to rising temperatures, melting ice caps, sea level rise, and more frequent extreme weather events, by capturing and storing $CO_2$ from industrial processes and power generation, it is possible to prevent a substantial portion of these emissions from entering the atmosphere, thereby slowing down the pace of climate change. In this regard, various geological formations, such as depleted oil and gas reservoirs and deep saline aquifers, offer potential sites for safe and secure $CO_2$ storage. Ongoing research and innovation are driving advancements in CCS technologies, including monitoring and verification techniques to ensure the long-term effectiveness and safety of stored $CO_2$.

Each of the above noted matters, i.e., using desert and other fine sands for the concrete manufacturing and storing the $CO_2$ emissions, individually faces its own problems. Thus, there is a need for a new strategy for addressing both problems simultaneously, in an integrated system that is capable of making the ingredients (e.g., sand) of the concrete more readily available without destroying the environment and acting at the same time as $CO_2$ storing agent, to overcome in a unitary manner these problems.

SUMMARY OF THE INVENTION

According to an embodiment, there is a sand aggregate that includes plural aggregate grains and at least one aggregate grain of the plural aggregate grains includes desert sand grains that are too small to be used in concrete applications, carbonate particles distributed on an external surface of the desert sand grains, and a sand-based glue that aggregates the desert sand grains together. The at least one aggregate grain has a size comparable to river sand grains, while the desert sand grains have a size smaller than the river sand grains so that the at least one aggregate grain is suitable for concrete applications.

According to another embodiment, there is a method for transforming desert sand grains into conforming sand for concrete applications, and the method includes providing the desert sand grains, treating the desert sand grains with a carbon dioxide capturing agent to produce enhanced sand grains, carbonating the enhanced sand grains to generate carbonate enhanced sand grains and simultaneously storing carbon dioxide on the exterior surface of the carbonate enhanced sand grains, and aggregating the carbonate enhanced sand grains to form a sand aggregate, which is a conforming sand for concrete applications and has similar sizes as river sand grains.

According to yet another embodiment, there is a plant for transforming desert sand grains into conforming sand for concrete applications, and the plant includes a first mixing device configured to receive and mix the desert sand grains and a $CO_2$ capturing agent to form enhanced sand grains, an adsorption chamber configured to receive the enhanced sand grains and mix the enhanced sand grains with a stream of $CO_2$ and a stream of water to form carbonate enhanced sand grains, a second mixing device configured to mix fine desert sand grains with a base stream to form a sand-based glue, and a third mixing device connected to the adsorption chamber and the second mixing device for receiving the carbonate enhanced sand grains and the sand-based glue and configured to mix the carbonate enhanced sand grains and the sand-based glue to form a sand aggregate. The desert sand grains are non-conforming for concrete applications while the sand aggregate is conforming for concrete applications.

BRIEF DESCRIPTION OF THE DRAWINGS

For a more complete understanding of the present invention, reference is now made to the following descriptions taken in conjunction with the accompanying drawings, in which:

FIG. 1A is a schematic diagram of a river sand grain that has a good size and roughness for concrete applications while

FIG. 9 illustrates the parameters of various experiments performed for transforming the desert sand grains into an aggregate that is appropriate for concrete applications;

FIG. 11 illustrates results of other measurements of the aggregate while being formed under different conditions.

DETAILED DESCRIPTION OF THE INVENTION

Figure 1A:
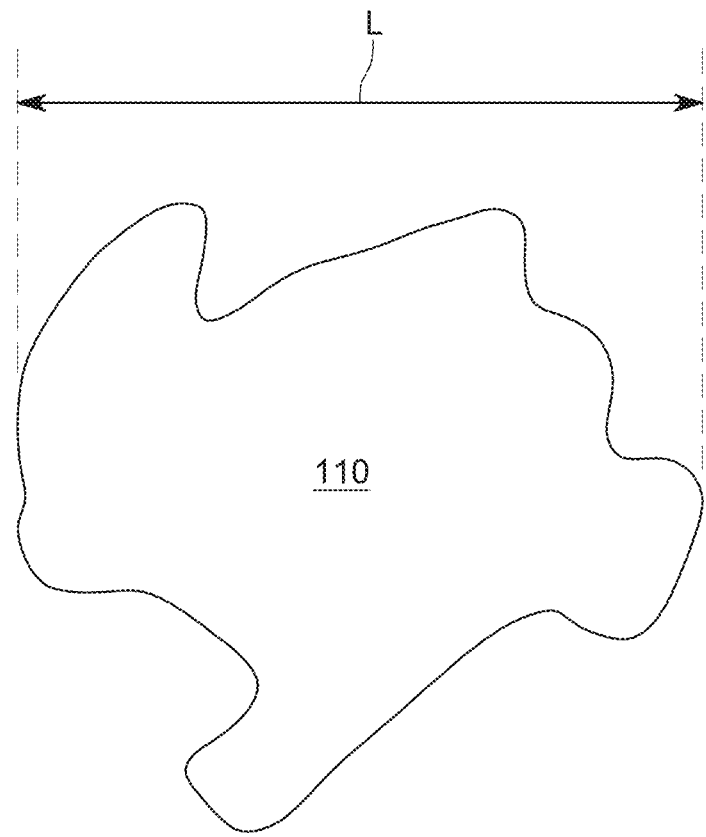

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to desert sand, which is typically unsuitable for concrete applications. However, the embodiments to be discussed next are not limited to desert sand, but may be applied to other types of sand that are not suitable for concrete applications.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method and system for storing $CO_2$ on the surface of desert sand for making this sand suitable for concrete applications is introduced. The method may simultaneously store the $CO_2$ on the desert sand grains and aggregate these grains to increase the size and/or surface roughness of the desert sand to become suitable for concrete applications. A variety of materials may be used for treating the sand to the effect of generating aggregates having an increased size, enough to become a suitable component of the concrete, and also to interact with the ambient or provided $CO_2$ for storing it. In one application, part of the unsuitable sand is etched to form a sand-based glue, which is used into the aggregate for "gluing" together plural sand grains. Details of the processes and system for generating this conforming sand that stores $CO_2$ are now discussed with regard to the figures.

Fine aggregate (sand), coarse aggregate (gravel) and hydraulic binder (cement) are the main raw materials used for the production of concrete and mortar which, when combined with water, produce very common construction materials. Of these three raw materials, the aggregates-sand and gravel-make up the largest percentage of the primary material inputs and are the most extracted group of materials worldwide. The sand is not homogeneous and can be classified by shape, with shapes and features varying from oblong, sharply angular to nearly spherical and smooth. Medium to coarse sand with rough surfaces and a sharply angular shape, such as river bank sand or costal sand grain are favorable for making concrete. Desert and other fine sands, on the other hand, are classified as nearly oblong, spherical shape and a smooth surface; these are considered unsuitable for using in concrete and cement, or banking up new land in the sea.

Desert sand, such as Yellow desert sand, dune sand, Qatar desert sand, Arabian desert sand, Gobi desert sand, red desert sand or black desert sand, is of siliceous nature, but may contain other impurities (i.e., iron oxides, iron silicates, mixed silicon iron oxides, etc.) and have a fineness modulus below 2.1. The Fineness Modulus is calculated based on a sieve analysis of the aggregate. In a sieve analysis, the aggregate is separated into different size fractions using a series of standard sieves with varying mesh sizes. The retained weight of material on each sieve is determined, and the Fineness Modulus is then calculated using the following formula:

Fineness Modulus (FM) =

(Sum of cumulative % retained on standard sieves)/100.

The Fineness Modulus value is a single number that represents the average size of the aggregate particles. A higher Fineness Modulus indicates a coarser aggregate, while a lower value indicates a finer aggregate. The typical range of Fineness Modulus values for fine aggregates used in concrete is between 2.2 and 3.2. Engineers and concrete mix designers use the Fineness Modulus as a guide to selecting appropriate combinations of aggregates to achieve the desired concrete properties for specific construction applications. It helps ensure that the particle size distribution of the fine aggregate is suitable for producing well-graded and workable concrete mixes.

The grain sizes or particle sizes of the sand is another parameter that is considered when determining the conforming properties of the sand. These sizes and their potential applications are as follow:

Coarse Sand has a grain size of about 2.0-4.0 mm and is used as a base material for construction projects like roads and foundations. It is suitable for mixing concrete and mortar.

Medium Sand has a grain size of about 0.25-2.0 mm and is commonly used in sandboxes and recreational areas, landscaping and leveling surfaces. This sand may also be used in brick and block laying.

Fine Sand has a grain size of about 0.075-0.25 mm and is used in sandblasting to clean and etch surfaces. It is suitable for making mortar and stucco, and also in sand filters for water purification. It is not suitable for concrete applications.

Very Fine Sand has a grain size of about 0.05-0.075 mm and is used in the production of glass and ceramics. It is suitable for sanding wood and metal surfaces.

Silt has a grain size of about 0.002-0.05 mm and is often considered an intermediate between sand and clay. It can be used in soil amendments and composting.

Clay has a grain size of about less than 0.002 mm and is used in pottery and ceramics due to its plasticity. It is an important component of soil for agriculture.

Construction Sand Mixes are various combinations of sand sizes which are used in construction projects to achieve specific properties in concrete, mortar, and other building materials.

Beach Sand is the natural sand found on beaches, often composed of a mixture of sand sizes. It is used for recreational purposes, sandcastles, and beach volleyball courts.

River sand (conforming sand) and desert sand (non-conforming sand) have different compositions and characteristics due to their distinct geological origins and environments. Here is an overview of their compositions. The river sand is typically composed of a mixture of various minerals, rock fragments, and organic materials. The composition can vary depending on the specific river and its surrounding geological features. Generally, river sand consists of:

Silica ($SiO_2$) in the form of quartz. Silica is a key component of most sand types and gives sand its characteristic hardness and resistance to weathering.

Mineral Fragments are found as small fragments of minerals and rocks that have eroded from the surrounding land. These fragments can include feldspar, mica, and other minerals.

Organic matter can also be present in the river sand, such as decomposed plant material and small organisms, particularly if it is close to the riverbed.

Various other minerals may be present, depending on the local geological conditions, like calcite, hematite, magnetite, and others in smaller quantities.

Different from the river sand, the desert sand is often characterized by its finer grain size and unique composition, which is due to the specific weathering processes and environments of desert regions. Desert sand is composed of:

Feldspar, which may be found in higher proportions compared to river sand. Feldspar is a group of minerals that are abundant in desert environments and contribute to the reddish or orange color of some desert sands.

Quartz, which may be found in a significant amount, which gives it its overall hardness and texture.

Lithic Fragments are weathered fragments of rocks and minerals, often with rounded edges due to wind erosion.

Iron Oxides can be found in a higher amount, which contributes to their reddish or yellowish coloration. Iron oxides are produced through weathering and oxidation of iron-bearing minerals in desert regions.

Calcium Carbonate may be found in some desert sands due to the evaporation of water and the accumulation of minerals in arid environments.

The river sand used in concrete is also referred to as "concrete sand" or "sharp sand." This type of sand is specifically selected and graded to meet the requirements of concrete production. It plays an important role in the strength, workability, and durability of concrete mixes. Concrete sand is generally characterized by the following properties:

Particle Size: Concrete sand has a well-graded particle size distribution, meaning it contains a range of particle sizes from fine to coarse. This distribution helps fill the voids between larger aggregates and provides a dense mixture.

Shape and Texture: The sand particles are typically angular or "sharp" in shape, which improves the mechanical interlock between particles and enhances the overall strength of the concrete.

Cleanliness: Concrete sand is usually free from excessive organic matter, clay, silt, and other impurities that could negatively impact the properties of the concrete.

Consistency: The sand should have consistent properties from batch to batch to ensure uniformity in the concrete mix.

In terms of classification according to industry standards, sand used in concrete is often classified based on its particle size distribution. Common classification systems include the Unified Soil Classification System (USCS) and the AASHTO (American Association of State Highway and Transportation Officials) classification. These systems categorize soil and aggregates based on particle sizes and other properties.

In the AASHTO classification, concrete sand is typically referred to as "ASTM C33 sand" or simply "Type F sand," and it falls within the "fine aggregates" category. Fine aggregates are further divided into three gradations: A, B, and C. Type F sand typically falls under the "A" gradation, which means it has a relatively uniform particle size distribution and is suitable for use in concrete.

Figure 1B:
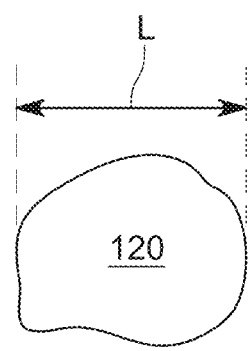
FIG. 1B is a schematic diagram of a desert sand grain which is too smooth and small for concrete applications.

Based on these classifications, the difference between the conforming sand and the non-conforming sand is schematically illustrated in FIGS. 1A and 1B, with FIG. 1A showing a conforming sand grain 110 and FIG. 1B showing a non-conforming sand grain 120. River sand grain 110 is a river sand and has an average size L larger than 2 mm, even larger than 1 mm, while desert sand grain 120 is a desert sand having an average size L smaller than 1 mm, even smaller than 0.8 mm. The roughness of the river sand grain is larger than the desert sand grain. The authors in [1] found that the average volume and surface area for the river sand grain is 2.17 $mm^3$ and 9.32 $mm^2$, respectively, while for the desert sand grain is 929.378.2 $\mu m^3$ and 49,913.6 $\mu m^2$, respectively. Thus, these characteristics of the desert sand grain are much smaller than for the river sand grain.

In one application, the "desert sand" is defined to be any sand that has (1) an average volume per sand grain smaller than half of the average volume of the river sand grain, and/or (2) an average surface area per sand grain smaller than half of the average surface area of the river sand grain. In another application, the "desert sand" is defined to be any sand that has (1) an average volume per sand grain smaller than half of the average volume of the river sand grain, and/or (2) an average surface area per sand grain smaller than one fourth of the average surface area of the river sand grain. In yet another application, the "desert sand" is defined to be any sand that has (1) an average volume per sand grain smaller than half of the average volume of the river sand grain, and/or (2) an average surface area per sand grain smaller than one tenth of the average surface area of the river sand grain. Those skilled in the art would understand that any of the above definitions for the desert sand relative to the river sand can be used as each of them quantitively defines the desert sand grains.

Figure 2:
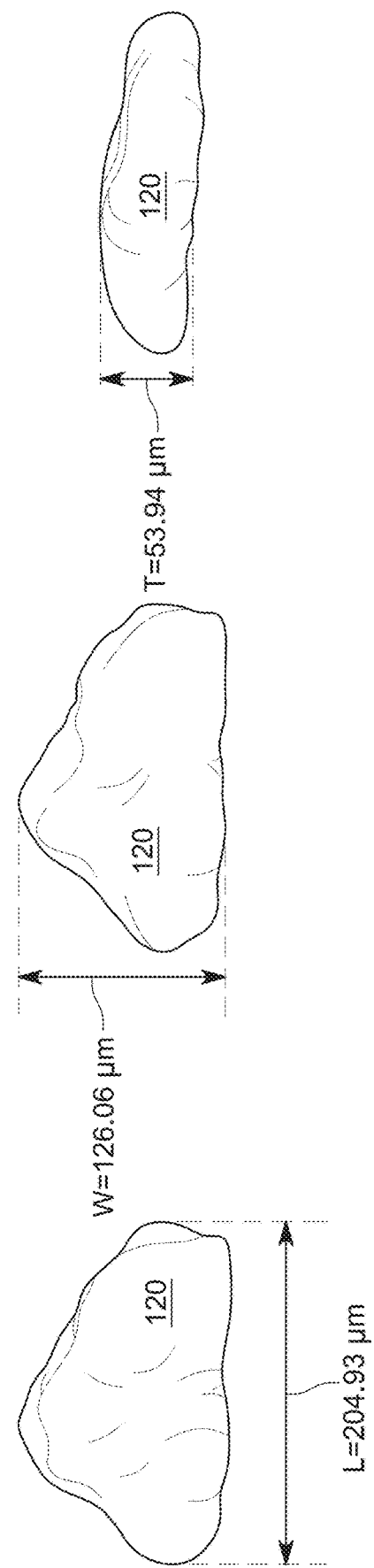
FIG. 2 schematically illustrates the length, width, and thickness of a sand grain.
Figure 3A:
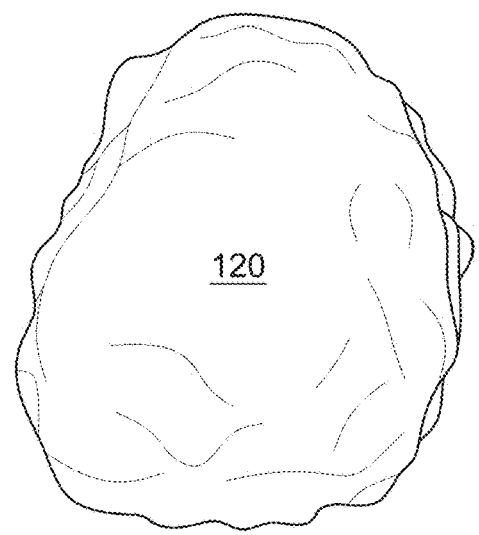
FIGS. 3A to 3D illustrate various parameters associated with the shape and size of a sand grain.
Figure 3B:
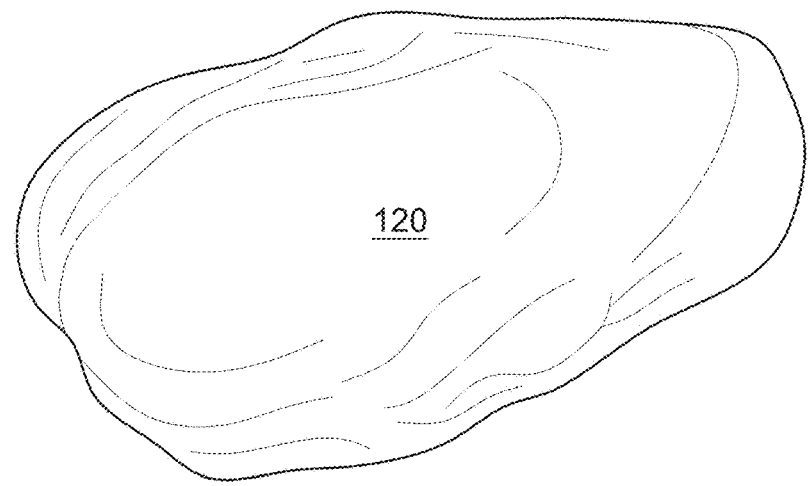
Figure 3C:
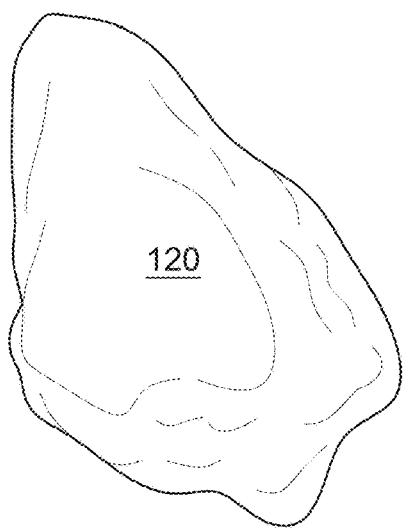
Figure 3D:
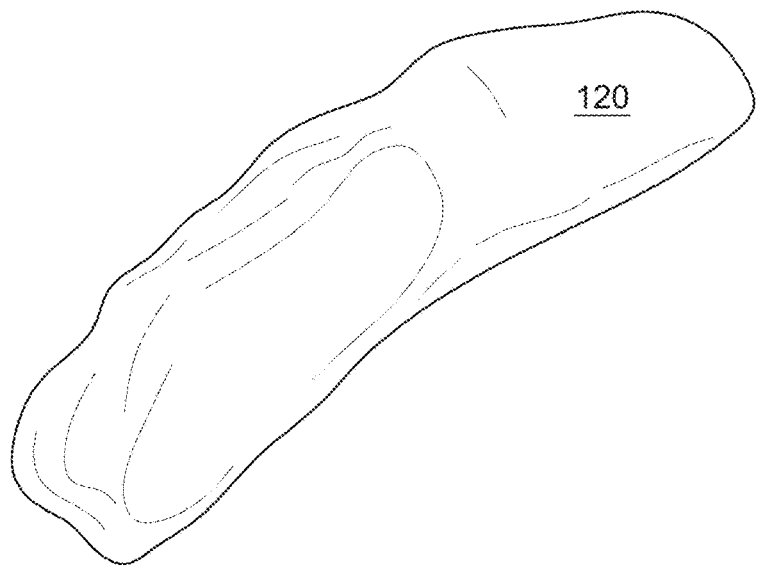

The river and desert sand grains can be further distinguished from each other. FIG. 2 shows a single desert sand grain 120 oriented along different directions, so that its length L, width W, and thickness T are visible, with L being larger than or equal to W, and W being larger than or equal to T, and each of L, W, and T is perpendicular on the other two sizes. Note that the same grain 102 is shown in FIG. 2. Based on these three characteristics of the sand grain, an elongation index EI and a flatness index FI can be defined for each grain. The elongation index EI is defined as the ratio of W and L, i.e., W/L, and the flatness index FI is defined as the ratio of T and W, i.e., T/W. Desert sand grains having different elongation and flatness indices are illustrated in FIGS. 3A to 3D. Their EI and FI values are also illustrated in the figures. In addition, these figures show the volume equivalent spherical diameter VESD, which is the diameter of a perfect sphere that has a volume equal to the volume of the actual sand grain. In one application, the "desert sand" is defined as any sand that has in average, each of the elongation index and the flatness index smaller than those of the river sand.

As the surface and size (or volume) of the desert sand grain are smaller, in average, than those of the river sand grain, according to an embodiment, a novel process and corresponding system are introduced to increase them, so that the non-conforming desert sand becomes conforming. In one of the methods discussed herein, $CO_2$ is used to partially increase the surface and size of the desert sand grain, in addition to other chemical elements that are discussed next. The novel process also uses a byproduct of the desert sand for aggregating plural desert sand grains to each other. However, in another method, no $CO_2$ is used to make the desert sand grain conforming.

Figure 4:
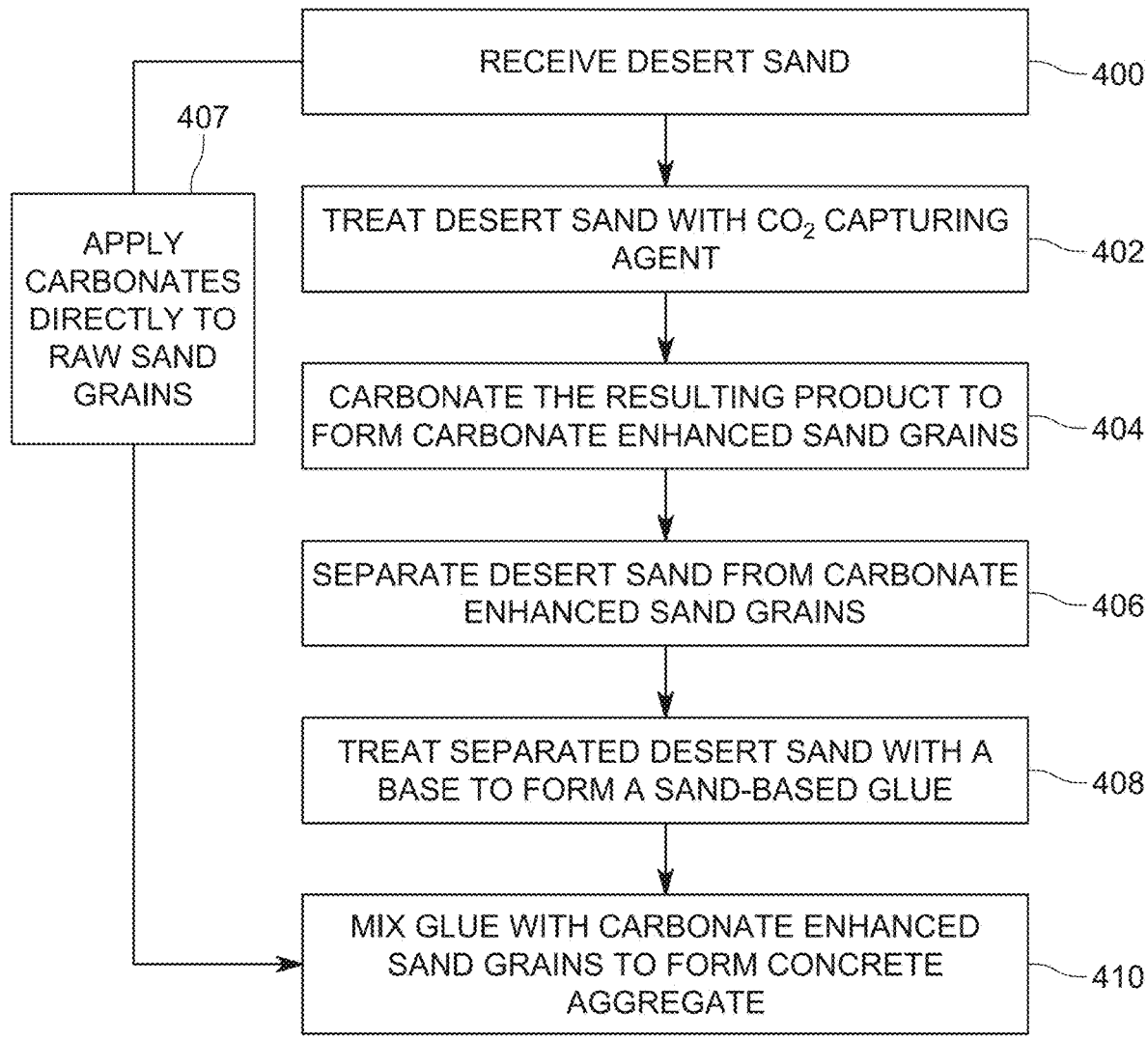
FIG. 4 is a flow chart of a method for transforming non-conforming desert sand grains into an aggregate that is suitable for concrete applications.
Figure 5:
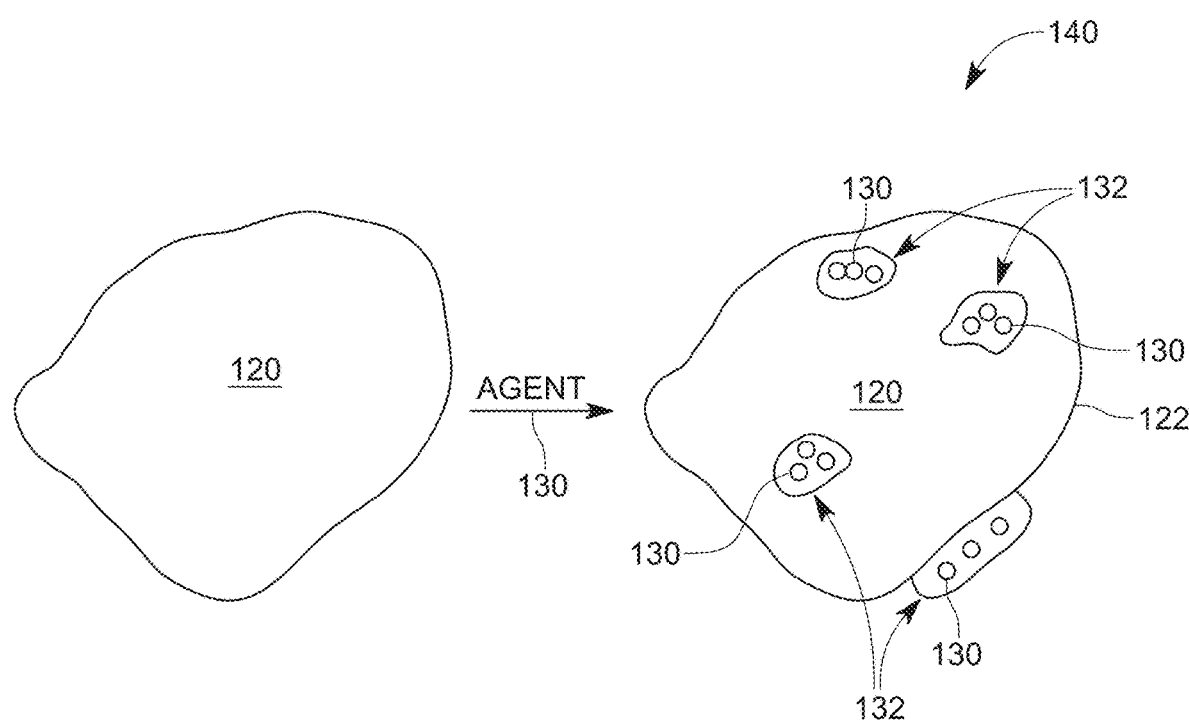
FIG. 5 illustrates the transformation of desert sand grains into enhanced sand grains with the addition of a $CO_2$ capturing agent.

More specifically, as illustrated in FIG. 4, the desert sand grains 120 received in step 400 are treated in step 402 with a $CO_2$ capturing agent 130, which is selected so that the agent adheres to the external surface 122 of the sand grains, as schematically illustrated in FIG. 5. The agent 130 is selected in this embodiment to be calcium hydroxide, $Ca(OH)_2$, which is typically obtained from the reaction of calcium oxide (CaO, also known as quicklime) and water. However, the agent 130 may include other metal hydroxides, i.e., magnesium hydroxide $Mg(OH)_2$, where the metal may be any divalent or monovalent metal (e.g., Li, Mg, Ca, Zn, Fe, Ba, Sr, etc.). The agent 130 may also be a metal oxide, for example, magnesium oxide MgO, where the metal may be any divalent or monovalent metal as noted above. Thus, the agent may be any of LiO, LiOH, MgO, CaO, ZnO, $Zn(OH)_2$, FeO, $Fe(OH)_2$, BaO, $Ba(OH)_2$, SrO, $Sr(OH)_2$, etc. In other words, any basic oxide or hydroxide of a divalent or monovalent metal may be used as the agent 130.

In one application, the agent may be extracted from industrial waste streams from various industrial processes. Such waste streams include, but are not limited to, mining wastes; fossil fuel burning ash (e.g., fly ash); slag (e.g. iron slag, phosphorous slag); cement kiln waste; oil refinery/petrochemical refinery waste (e.g. oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge.

Figure 6:
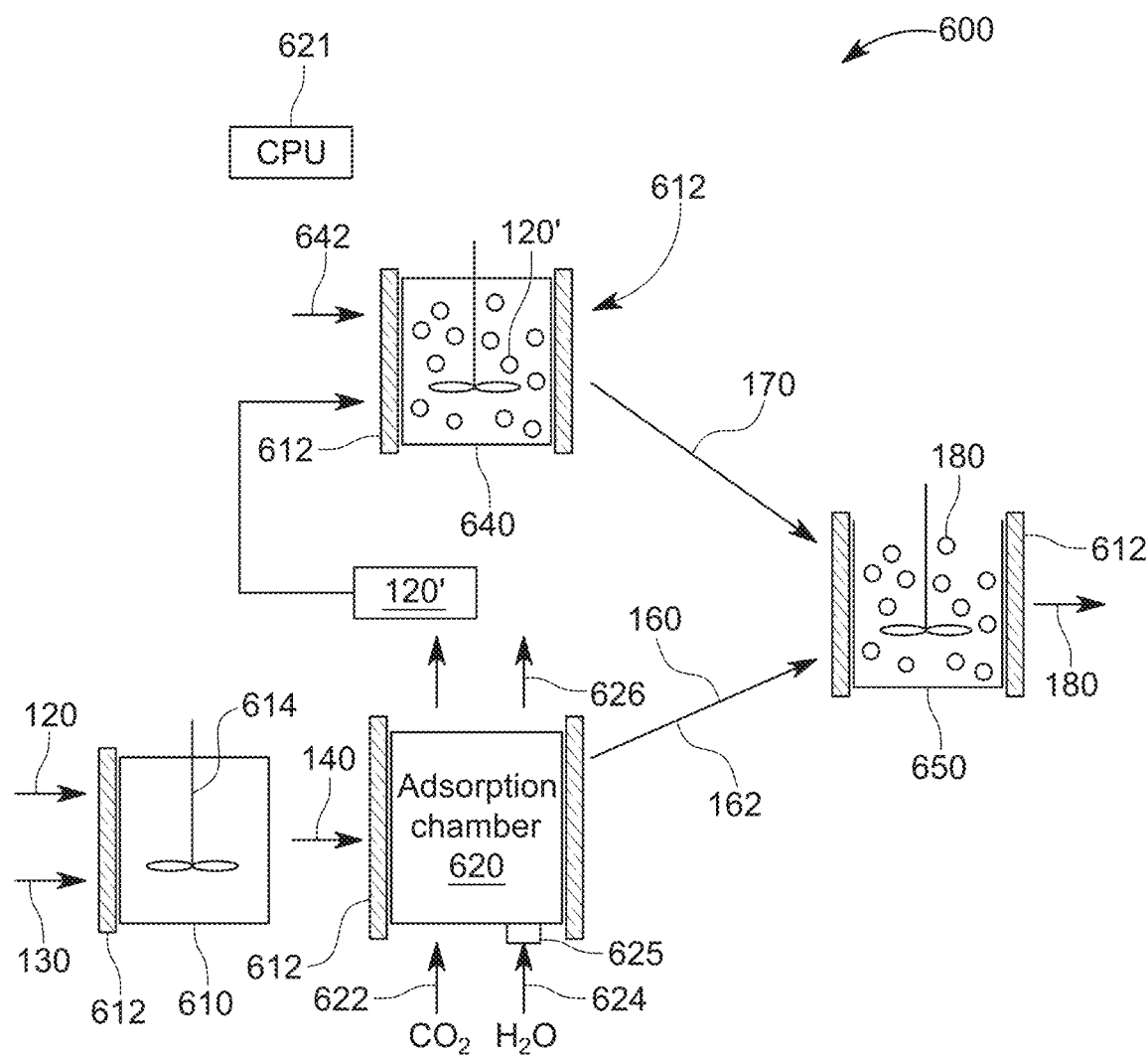
FIG. 6 is a diagram of a plant used for transforming non-conforming desert sand grains into an aggregate that is suitable for concrete applications.

FIG. 6 schematically illustrates a corresponding plant 600 that is configured to receive the desert sand grains 120 and the agent 130 and mix them in a first mixer device 610. This process is performed via physical mixing of the sand grains 120 and agent $Ca(OH)_2$ 130 or via stirring a suspension of the oxide or hydroxide in water, alcohol or a mixture of solvents for a time range of 1-24 hours. Instead of water and/or alcohol, any common solvent can be employed. The mixing can happen at a wide range of temperatures (i.e., 20-1000° C.), although room temperature (25° C.) is preferred. If the temperature needs to be above room temperature, a heater 612 may be provided next to the first mixer 610 to maintain the desired temperature. A controller 621, for example a processor, may be provided for maintaining the desired temperature in the first mixer 610. The controller 621, which may be connected in a wired or wireless manner to the first mixer 610, may also be configured to control a speed of the mixing blade 614, which mixes the sand and the agent. Physical mixing results in a more homogeneous final mixture and is preferred over others for the employment in the further steps.

The islands 132 of the agent 130 formed on the exterior surface 122 of the desert sand grain 120 provide heterogeneity to the desert grain, modifying its original morphology. In this way, each of the sizes L, W, and T are increased and the roughness of the surface of the grains is also increased. However, these increases are not enough to make the non-conforming desert sand grains 120 conforming, i.e., after the step 402 treatment, the desert sand grains with the islands of the agent, called herein "enhanced sand grain" 140, still have characteristics that fit the "desert sand" definition, and not the "river sand."

Next, the enhanced desert sand grains 140 are carbonated in step 404. The carbonation step takes place in an adsorption chamber 620 (see FIG. 6) in which a stream of $CO_2$ 622 and a stream of water 624 are simultaneously provided to react with the enhanced desert sand grains 140. The carbon dioxide may be obtained from an industrial waste stream in an aqueous solution and precipitating one or more carbonate compounds from the aqueous solution, dewatering the precipitate, and in some embodiments further treating the dewatered precipitate to produce an aggregate. The industrial waste stream may be any suitable waste stream, as described herein. In some embodiments, the industrial waste stream is the flue gas from a coal-fired power plant. Contacting between the $CO_2$ and the sand may be performed by any suitable apparatus and procedure, also as described herein, such as by a flat jet contactor, or by aerosol contact. In some embodiments, the $CO_2$ in the industrial waste stream is contacted with the aqueous solution using a flat stream contactor. More specifically, the stream of water may be contacted with the stream of $CO_2$ using any convenient protocol. Where the $CO_2$ is a gas, contact protocols of interest include, but are not limited to: direct contacting protocols, e.g., bubbling the gas through the volume of water or saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. In one embodiment, contact is achieved between a flat jet liquid sheet and the gas, where the sheet and the gas may be moving in countercurrent, cocurrent, or crosscurrent directions, or in any other suitable manner.

Figure 7:
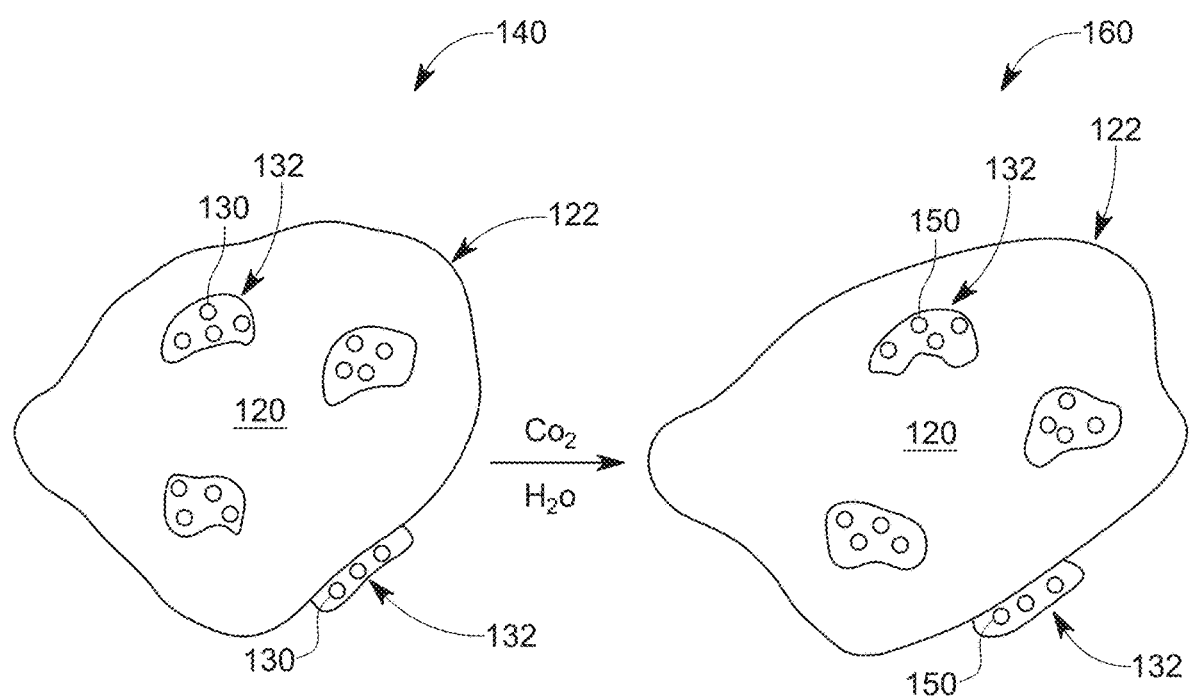
FIG. 7 illustrates the transformation of the enhanced sand grains of FIG. 5 into carbonate enhanced sand grains with the addition of $CO_2$, and the transformation of the capturing agent into a carbonate compound.

The chamber may be provided with a heater 612 for controlling the temperature inside, through the controller 621. When the agent 130 reacts with the silica from the sand grains 120 and the $CO_2$ 622 and water 624, the following reactions take place:

$$Ca(OH)_2 \rightarrow Ca^{2+} + 2OH^-$$

$$CO_2 + H_2O \rightarrow CO_2 \cdot H_2O$$

$$CO_2 \cdot H_2O + 2OH^- \rightarrow CO_3^{2-} + 2H_2O$$

$$Ca^{2+} + CO_3^{2-} \rightarrow CaCO_3,$$

thus forming carbonate particles 150 on top of the surface 122 of the sand grains 120, as schematically illustrated in FIG. 7. Note that the calcium carbonate particles 150 are the result of the transformation of the agent 130 during the carbonation reaction of step 404. If the agent 130 is not Ca based, then the formed carbonate particles 150 are magnesium carbonate particles or other type of particles (e.g., sodium carbonate, potassium carbonate, ammonium carbonate, barium carbonate, etc.), depending on the type of agent 130. The resulting sand grains are called herein "carbonate enhanced sand grains" 160. The carbonate enhanced sand grain has stored $CO_2$ in the process of step 404, thus resulting in the size increase of each grain.

Step 404 may be performed either under flow or under static conditions, i.e., the enhanced sand grains 140 are either moving through the adsorption chamber 620 during this step, or they are stationary within the chamber. In one application, a conveyor belt (not shown) may be used to bring the enhanced sand grains from the first mixer device 610 to the chamber 620. In one application, chamber 620 can be a vertical quartz tube with a frit, where the sand is sitting. The stream of $CO_2$ flows through the sand bed from top to bottom. The $CO_2$ stream (diluted or not with an inert gas, e.g., $N_2$) can go through a bubbler to bring water to the reaction. Alternatively, sand can be wetted prior to the reaction. Unreacted $CO_2$, if any, leaves at the bottom of the chamber. In one application, the tube can be horizontal (without a frit in this case). In yet another application, the sand may enter the adsorption chamber from top to bottom, bottom to top, from side to side, or a combination of any of these configurations. The sand will enter in contact with the gas in this process, which might enter the reactor in any of the configurations mentioned. In case the sand stands on a surface and not flowing during the adsorption process, it will be located over a porous material (between 100 nm and 1 cm), in order to allow the gas to pass through it.

The concentration of carbon dioxide stream supplied within the chamber 620 can vary between atmospheric concentration to 100% and the process can be performed at atmospheric or other pressures (between 0.1 and 300 bar) and in a wide range of temperatures (0 to 1000° C.). Step 404 may be performed in the absence of humidity; however, the addition of water vapor brings higher carbonization yield (from 5 to 60%). Higher temperatures also favor a faster carbonization yield.

While this step is discussed with regard to a $CO_2$ stream, other acidic gases may be used, for example, $SO_2$, $SO_3$, $H_2S$, $P_2O_3$, $P_2O_5$, $Cl_2O$, $Cl_2O_3$, $Cl_2O_5$, $Cl_2O_7$, $N_2O_5$, $N_2O_3$, $N_2O$. The average weight increase of the original desert sand grains 120, in the process of becoming the carbonate enhanced sand grains 160, has been observed to be about 1 to 30%, depending on the applied temperature and $CO_2$ concentration in the flow. The carbonate enhanced sand grains 160 may further be processed to increase its sizes, to be comparable to the river sand grains. However, if the carbonate enhanced sand grain 160 is used at this stage to make concrete, a compressive strength of such concrete was measured to be about 43.8 N/mm² after 28 days. As a reference, the International Building Code (IBC) (Section 1905.1.1) and the ACI 318 Standard (Section 5.1.1) indicate a minimum specified compressive strength of 2500 psi (17 MPa or 17 N/mm²) for structural concrete.

The method discussed with regard to FIG. 4 may further process the carbonate enhanced sand grains 160 to further increase their size. During the steps 402 and 404, not all desert sand grains 120 get the capturing agent 130 and/or the carbonate particles 150, thus their original small size is barely increased at this stage. These fine desert sand grains 120', which are characterized by a very small size, are separated in step 406 from the carbonate enhanced sand grains 160, in the chamber 620 and these grains are taken to a second mixer device 640. The separation in step 406 may be achieved by sieving. This step can be performed before the carbonization or after, with the former as a preferred way. In general, the order of steps 404 and 406 can be altered. The step 406 can be considered as the very first step, as only very small untreated particles are used for the "glue" (or "water glass") preparation. Thus, if step 406 is performed first, the sand for the glue is not carbonated. In another embodiment, the separation in step 406 may be achieved by using a cyclone.

Note that an output of the step of 404 is flue gases 626, which are released from chamber 620. Also note that fine desert sand grains 120' taken from the chamber 620 and provided to the second mixer device 640 may also include small amounts of enhanced sand grains 150 and/or carbonate enhanced sand grains 160, which have a very small size and are still not appropriate for concrete applications. All these components of non-conforming sand are referred to herein as fine desert sand grains 120'.

In the second mixer device 640, the fine desert sand grains 120', which were rejected from chamber 620, may be treated in step 408 with an aqueous solution of a base 642. The base may be NaOH, KOH or LiOH at a concentration of 2-8M with a temperature range of 20-200° C. This step is performed with the aim of attacking the silica on the surface of the fine desert sand grains 120' with a strong base and dissolving it by forming a silicate solution in water, i.e., creating an in-situ "glue" (in-situ water glass, a term used for an aqueous solution of silicates) 170. The resulting solution 170 contains the base and dissolved silica in the form of sodium silicate. This material is used further in the procedure, as discussed next. This colloidal solution 170 is named SBG, which stands for sand-based glue. The SBG can be concentrated by partially evaporating the present water (e.g., between 10 to 90%), for example, by using the heater 612.

Steps 402 to 404 discussed above may be replaced with a single step 407 of applying carbonates directly to the desert sand grains 120 to obtain direct carbonate enhanced sand grains 162. This application step consists of bringing carbonate powder and desert sand grains together under a slightly basic environment in a mixing room. A slightly basic environment can be achieved by spraying an aqueous solution of a base over the mixture during the mixing. The base can be either inorganic or organic base, including but not limited to NaOH, KOH, $NH_4OH$, $NH_3$, amines, etc. The inventors have made concrete samples with this type of direct carbonate enhanced sand grains and found that a compressive strength is 50.0 N/mm² after 28 days, which is slightly better than the carbonate enhanced sand grains 160. However, if this step is used, no $CO_2$ storing is achieved.

Note that step 407 in FIG. 4 may or may not be followed by step 410. In other words, it is possible to just stop the method at step 407. The same is true for the step 404 as, at this point, the obtained carbonated enhanced sand grains are ready to be utilized in construction. Overall, the carbonation steps 407 or 404 can be considered as terminal steps. The step 408 of generating the "glass water" and then mixing it in step 410 with the carbonate enhanced sand grains is an optional route that can be applied to the treated or not treated sand to further enhance the compressive strength of the concrete to be made.

Returning to the process illustrated in FIGS. 4 and 6, the carbonate enhanced sand grains 160 (or the direct carbonate enhanced sand grains 162) together with the sand-based glue 170 are supplied to a third mixing device 650, where they are mixed together in step 410, with the aim of aggregating together plural of the grains 160 or 162, to obtain sand aggregate 180. In one application, binders are provided to the carbonate enhanced sand grains 160 before this step. Binders may be added to assist in holding the powdered material together, either to provide structural stability or to act to hold the powders in place while further processing takes place. Typical binders include, but are not limited to, Portland cement, flyash, silica, citric acid, gum Xantham, or combinations thereof. Binders include those which become relatively fluid during heating and reharden when cooled. In one application, the sand-based glue 170 may be replaced by the binder.

Figure 8:
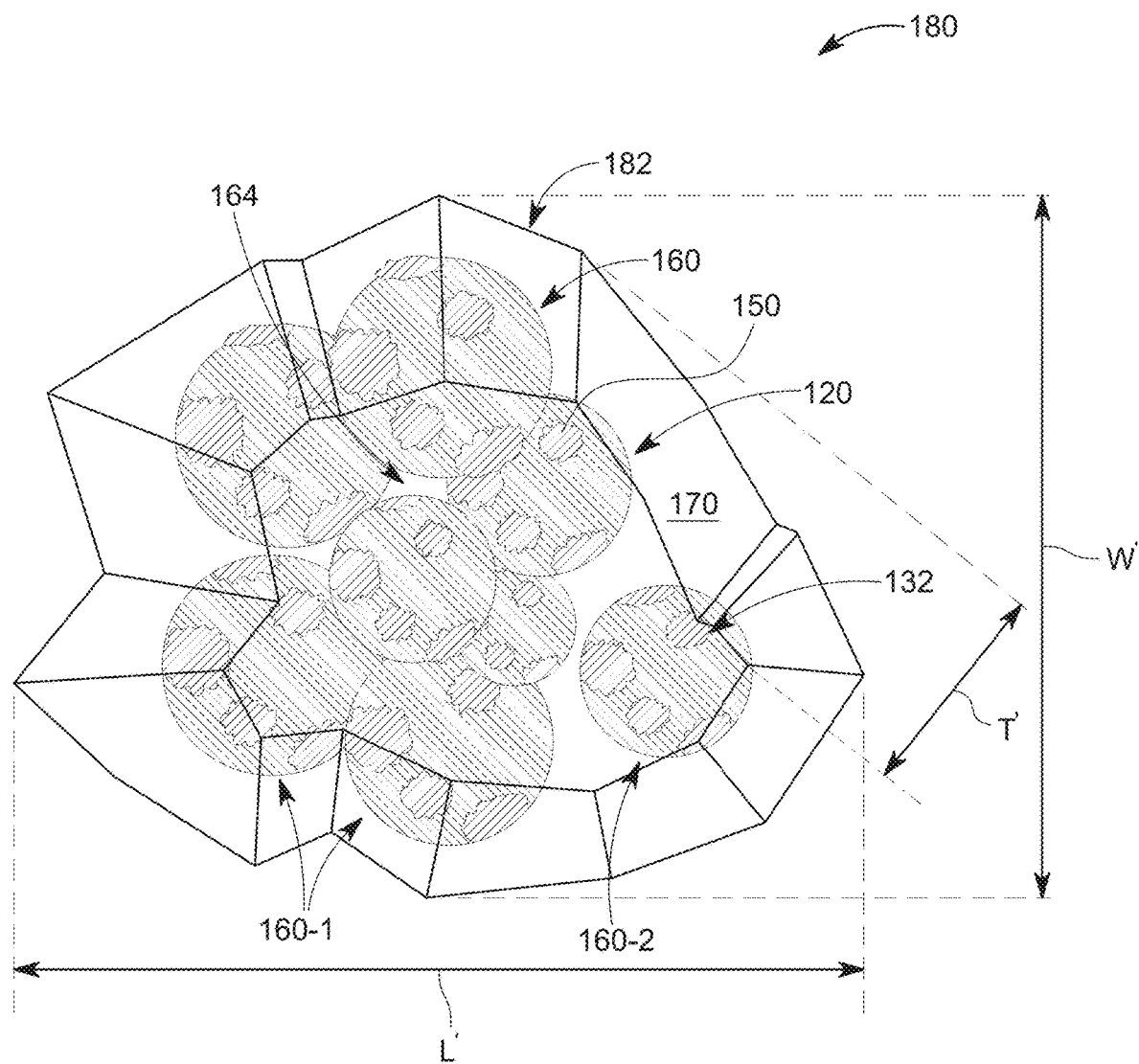
FIG. 8 schematically illustrates an aggregate obtained based on the process illustrated in FIG. 4.

The aggregation of the carbonate enhanced sand grains 160 (or 162) is performed by treating them, either under static conditions, under stirring or under shaking, with the resulting glue 170 within the third mixing device 650 at a given temperature T. The temperature is achieved with a heater 612 which is controlled by controller 621. In one application, glue 170 has been preconcentrated by water evaporation, although this step is optional. The resulting sand aggregate 180, a grain 182 of which is schematically illustrated in FIG. 8, includes plural carbonate enhanced sand grains 160 (or 162), which means that the corresponding sizes L', W', and T' have increased considerably, transforming the original desert sand grains 120 from nonconforming to conforming, i.e., having these sizes comparable (substantially the same) as the river sand grains. FIG. 8 shows the plural carbonate enhanced sand grains 160 (or 162) being completely embedded into the glue 170, thus forming the concrete aggregate grain 182. Note that the grains 160 or 162 may be only partially embedded/covered by the glue 170. Also note that the sand aggregate 180 includes plural grains 182, where at least one single grain 182 has the structure shown in FIG. 8. Note that some of the carbonate enhanced sand grains 160 (or 162) may be directly in contact with each other, as indicated by grains 160-1 while other grains 160-2 are not in direct contact with the rest of grains 160. Spaces 164 may be present between the grains 160, as schematically illustrated by FIG. 8. These spaces may be filled in with the glue 170. The hardening of the glue 170 around grains 160/160-1/160-2 occurs either under static conditions, under stirring, under shaking or by spraying the resulting slurry in a temperature range of 20-300° C. Depending on the methodology used, hardening may occur instantly or in the range of 1-72 hours. Although a similar approach could be used to aggregate uncarbonated sand particles, the presence of carbonate facilitates, to a large extent the hardening, and results in the formation of bigger particles, more adequate for concrete.

In one application, the newly formed sand aggregate 180 has an average size (e.g., length) in the range of 0.5 to 10 mm. In another application, the average size is larger than 1 mm. In yet another application, the average size is larger than 2 mm. The cross-section of this newly formed sand aggregate shows smaller original sand particles embedded into the hardened glue 170. Following the approach illustrated in FIG. 4, utilizing calcium hydroxide, 2M solution of sodium hydroxide and four hours of wet $CO_2$ flow treatment, the overall mass gain of the sand aggregate 180 was 7.2%, which is the contribution from the captured carbon dioxide. To increase the size of sand grains 120 or 160 and bring them to the chunks of millimeters range, other colloidal solutions of silica (i.e., Ludox® colloidal silica) may be used for a similar purpose. This approach results in big compact particles. Other colloidal solutions of silica may be used with the desert sand grains.

In one application, a sea water brine may be used to make the process negative in $CO_2$ emissions. For this embodiment, the carbon dioxide capturing agent 130 is magnesium oxide. Magnesium oxide is obtained from magnesium hydroxide by simple dehydration reaction. In turn, magnesium hydroxide is obtained by reacting magnesium chloride and magnesium sulphate (that can be part of desalination brine) with sodium hydroxide. Magnesium chloride and magnesium sulphate are obtained from sea water by common methods, e.g., sea water evaporation. Magnesium ions, i.e., magnesium salts are the second most abundant anion in the seawater. Sodium hydroxide is also obtained from sea water by simple electrolysis of sea water. Sea water is mostly sodium chloride, with sodium ions being the most abundant ions in the sea water. The electrolysis can be performed with the means of renewable energy. Solar panels are one of the sustainable options here. The chemical reactions involved in this process are:

$$NaCl_{(aqueous)} \rightarrow NaOH + Cl_2 + H_2 \text{ (driven by electrolysis)}$$

$$MgCl_2 + 2NaOH \rightarrow Mg(OH)_2 + 2NaCl$$

$$MgSO_4 + 2NaOH \rightarrow Mg(OH)_2 + Na_2SO_4.$$

The inventors performed a couple of experiments based on the method illustrated in FIG. 4 and the plant 600 illustrated in FIG. 6. For these experiments, the following type of sand have been used:
A) South beach sand (a beach at the Red Sea);
B) South beach sand+Ca(OH)₂ relation 3:1 (m:m);
C) South beach sand+Ca(OH)₂ relation 5:1 (m:m);
D) South beach sand+Ca(OH)₂ relation 7:1 (m:m).

The solid mixtures were obtained by adding raw sand with Ca(OH)₂ powder.

The desert sand samples included:
A) Sand collected near Thuwal, Saudi Arabia;
B) Sand collected near Thuwal+Ca(OH)₂ relation 5:1 (m:m).

Each of these sands were prepared and processed as discussed above with regard to FIG. 4. The conditions and parameters used in these experiments are listed in the table of FIG. 9. It is noted that in step 404, when the sand grains were treated with the $CO_2$ stream, a stream of $N_2$ was also added to the mixture (in chamber 620 in FIG. 6). The weights of the sample sand used in the experiments and their weight after processing (i.e., the weight of the sand aggregate) is also provided in the table of FIG. 9. The second to last column in this table indicates the mass increase of each sample.

It is noted that both types of sand show a similar increase in weight after the experiments, more similar as the reaction time increases. The weight increase is similar for the 23 h experiments, 9% vs 8.2% increase using south beach sand and Thuwal sand, respectively (experiments 1 and 3 in the table of FIG. 9). At 4 h experiments, the weight increase are slightly different, 9% and 7.4% using South beach sand and Thuwal sand, respectively (experiments 5 and 6 in the table).

The effect of the reaction time was also studied. The 4 h and 23 h experiments show almost the same increase in sample weight. The weight increase observed with the South beach sand is the same in the experiments during the 4 h and 23 h reaction time, i.e., about 9%, experiments 1 and 5 in the table. In the case of Thuwal sand, there is a slight change (from 8.2% to 7.4% weight increase) for the experiments 3 and 6 in the table.

The inventors also studied the effect of a water bubbling system 625 (see FIG. 6) used for providing the water to the chamber 620. Two experiments were run in order to evaluate this effect. Experiment 2 was run without the bubbler, showing no increase in the sample weight after the experiment, which indicates that no $CO_2$ is adsorbed when water is not present. Experiment 4 was run using just a $N_2$ flow through the bubbler, without $CO_2$. The sample showed a weight increase of 4%, which might be due to the adsorption of water vapor.

The effect of sand/Ca(OH) 2 (m/m) relation was also studied. It was observed that as the content of $Ca(OH)_2$ increases in the mixture sand/$Ca(OH)_2$, the more $CO_2$ is adsorbed. The weight increase goes from 6.8% when the sand/$Ca(OH)_2$ relation is 7:1, to a 14.6% weight increase when the relation is 3:1 (experiments 5, 7 and 8 in the table of FIG. 9).

Figure 10:
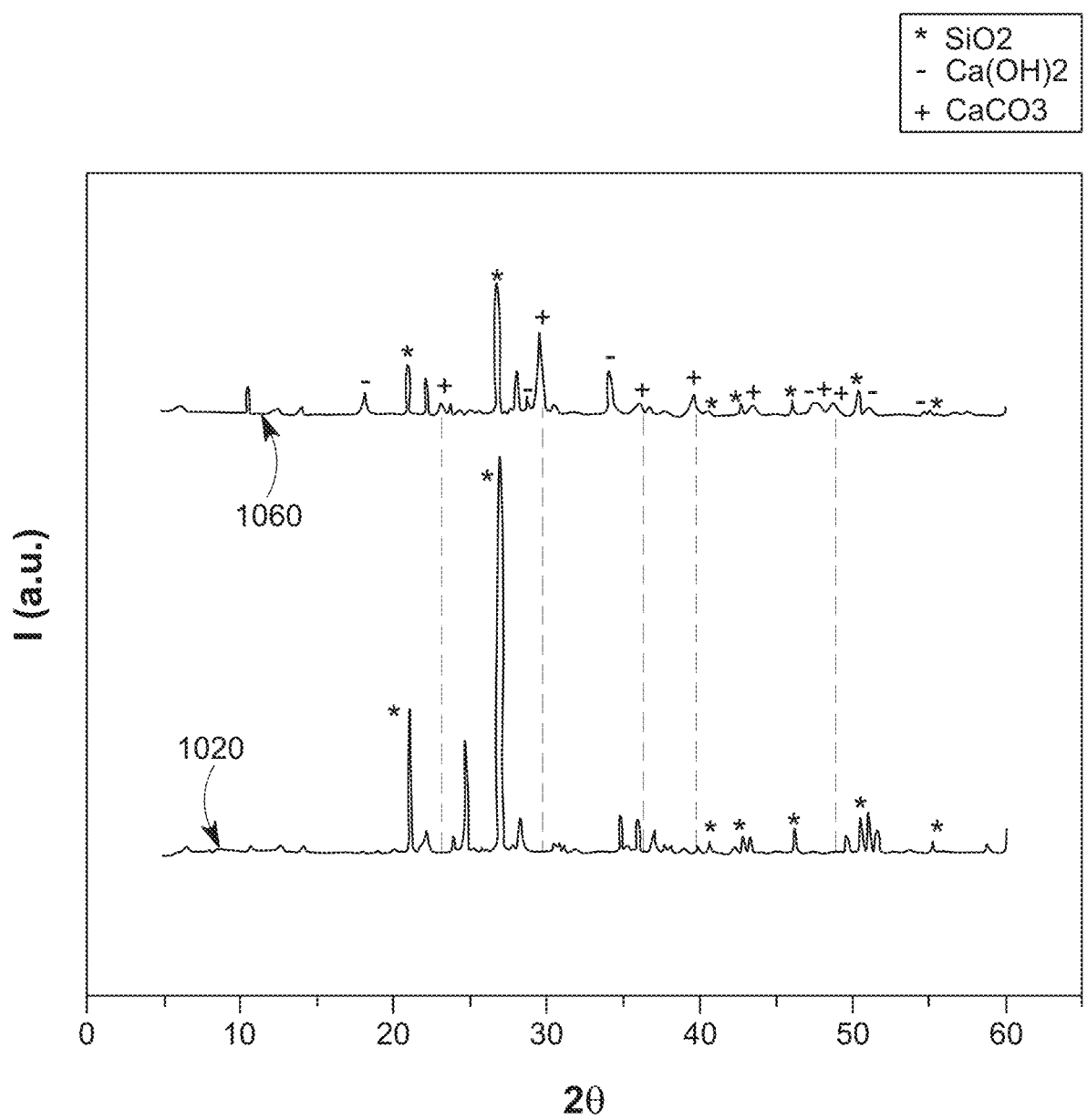
FIG. 10 illustrates results of some measurements of the aggregate and the raw desert sand grains.

The inventors also analyzed the chemical composition of the original desert sand grains 120 (collected at Thuwal, Saudi Arabia) and the carbonate enhanced sand grains 160 and FIG. 10 shows the corresponding X-ray diffraction curves 1020 and 1060. It is noted that the original desert sand grains 120 had some small amounts of $Ca(OH)_2$ and $CaCO_3$ present, but these amounts are considered to be insignificant (i.e., below 1% by mass) when compared to the amounts (between 1 and 50% by mass of carbonate) gained by the carbonate enhanced sand grains 160. In one application, the carbonate enhanced sand grains include between 8 and 20% by mass, carbonate.

The inventors also performed the method discussed above with regard to FIG. 4 in open air, i.e., the carbonating step 404 took placed in open air, so that the ambient $CO_2$ and ambient air humidity were used for the streams 622 and 624 supplied to the chamber 620 in FIG. 6. The sand was exposed to the ambient conditions for 24 hours at a relative humidity of about 75% within a temperature range of 24-34° C. The results for the raw desert sand grains 120 and the enhanced carbonate sand grains 160 exposed to ambient $CO_2$ and $H_2O$ are presented in the table of FIG. 11. It is noted that the sand 120 mixed with agent 130 show a weight increase of about 1.5%, while the raw sand sample 120 shows a negative weight increase, probably due to the evaporation of water present in the sand particles. If compared to experiments performed in the table of FIG. 9 (experiments 3 and 6), a lower weight increase is observed at ambient conditions. This is likely due to the less amount of $CO_2$ that the sample was in contact with in the ambient, as well as the lower relative humidity in comparison with the experimental setup. Thus, while not as efficient as when the carbonation reaction takes place in the chamber 620, the carbonation of the sand in the open environment still achieves a small weight gain.

Figure 12:
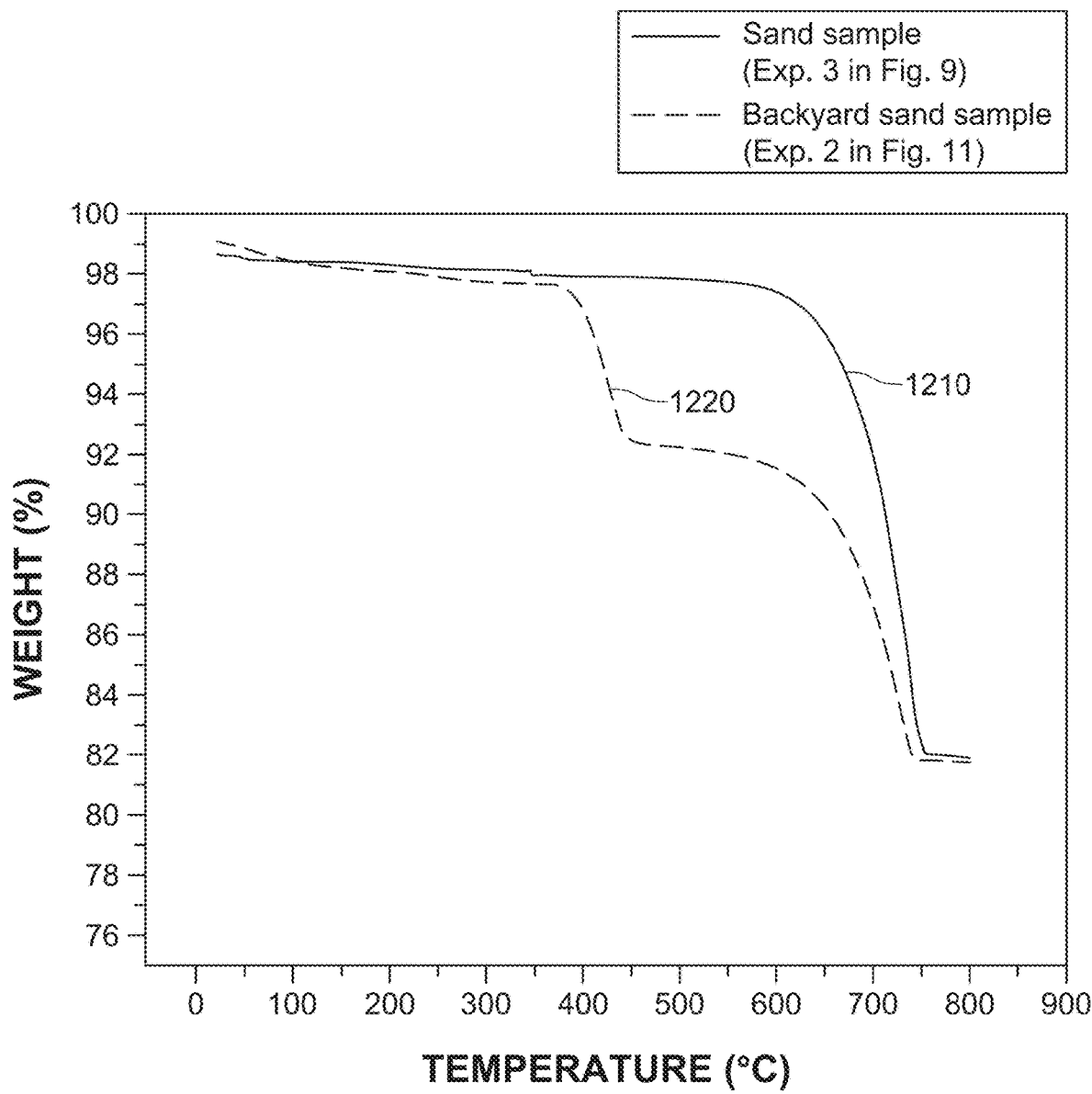
FIG. 12 illustrates the results of thermogravimetric analysis on different desert sand grain samples processed with the method of FIG. 4.

Another experiment performed by the inventors was the thermogravimetric analysis (TGA) of the obtained sand to verify the formation of calcium carbonate due to the carbonation. FIG. 12 illustrates the change in weight of the samples as the temperature of the sample increases. According to [2], $Ca(OH)_2$ decomposes between 40° and 500° C. to CaO and $H_2O$ and $CaCO_3$ decomposes above 600° C. to CaO and $CO_2$. FIG. 12 shows the mass of the sand sample (experiment 3 in FIG. 9) decreasing just above 600° C., which indicates the presence of $CaCO_3$, while the mass of the sand sample (experiment 2 in FIG. 11) decreases first between 40° and 500° C. and then just above 600° C., which indicates the presence of both the $Ca(OH)_2$ and $CaCO_3$. In other words, the sand sample exposed to ambient conditions (curve 1220 in FIG. 12) presents a mixture of both $Ca(OH)_2$ and $CaCO_3$ material. The sand sample from the experiment run in the experimental setup (curve 1210 in FIG. 12, experiment 3 in FIG. 9) shows the presence of only $CaCO_3$. Both sand samples present a similar weight loss in the TGA analysis (~15%).

As discussed above, the obtained sand aggregate 180 behaves like conforming sand and thus, it can be used instead of the river sand grains in any concrete application. The sand aggregate 180 may be used in fact in any application that the river sand can be used, even if not a concrete application, i.e., as a sublayer in the construction of a road, patio, driveway, walkway, train tracks, etc. In one embodiment, the sand aggregate 180 is used mainly to store $CO_2$ and then this material may be used to fill a cave, abandoned mine, abandoned well, etc. In still another embodiment, the sand aggregate may simply be buried underground for storing the $CO_2$ there. In yet another application, the sand aggregate 180 may be used in a cementless application, for example, may be mixed with a resin or any known bonding element to form bricks, paves, tiles, or other flooring materials or other general construction materials.

Aggregates 180 may also find use in place of conventional natural rock aggregates used in conventional concrete when combined with pure Portland cement or to form a Portland cement blend. The term "Portland cement blend' includes a hydraulic cement composition that includes a Portland cement component and significant amount of a non-Portland cement component. As the cements in this embodiment are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards).

While the sand aggregate 180 has been discussed in the context of storing $CO_2$, in some embodiments, the aggregates is capable to store (or sequester) one or more components of a human-produced waste stream, typically an industrial waste stream that includes, though is not limited to, gaseous components. Generally, the one or more components sequestered by the aggregates are components for which release to the atmosphere or to the environment in general is undesirable. For example, for a flue gas waste stream, undesirable components include CO, sulfur oxides ($SO_x$, such as $SO_2$ and $SO_3$), nitrogen oxides ($NO_x$, such as NO and $NO_2$), heavy metals such as mercury, cadmium, lead, and/or others well-known in the art, particulates, radioactive substances, organic compounds, and other undesirable components, e.g., any component regulated by government or other regulatory agencies. Thus, the sand aggregate 180 may be processed to include/store any of these undesired materials by modifying the stream 622 supplied to the chamber 620 to include such elements. These elements may be mixed with the $CO_2$ stream.

Why the process in FIG. 4 has been discussed in relation to the use of calcium carbonate $CaCO_3$, those skilled in the art would understand that many forms of this material or similar materials may be used. In this regard, [3] aptly describes that the carbonate compounds include precipitated crystalline and/or amorphous carbonate compounds, or even bicarbonate compounds. Specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to: dypingite ($Mg_5(CO_3MOH)_2 \cdot 5(H_2O)$; the term dypingite is used herein to include dypingite minerals of this formula), magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$) and amorphous magnesium carbonate ($MgCOynH_2O$). Calcium magnesium carbonate minerals of interest include, but are not limited to dolomite ($CaMgCO_3$), huntitte ($CaMg(CO_3)_4$) and sergeevite ($Ca_2Mg_{11}(CO_3)13 \cdot H_2O$). In certain embodiments, non-carbonate compounds like brucite $Mg(OH)_2$ may also form in combination with the minerals listed above. As indicated above, the compounds of the carbonate compounds may be metastable carbonate compounds (and may include one or more metastable hydroxide compounds) that are more stable in saltwater than in freshwater, such that upon contact with fresh water, they dissolve and re-precipitate into other fresh water stable compounds, e.g., minerals such as low-Mg calcite.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, as used herein, the term "if" may be construed to mean "when" or "upon" or "in response to determining" or "in response to detecting," depending on the context.

The disclosed embodiments provide a method and system for processing desert sand grains to make them conforming with concrete aggregate requirements and/or sequestering $CO_2$ in the formed aggregate. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Liu, X.; Liu, R.; Lyu, K.; Gu, Y. A Quantitative Evaluation of Size and Shape Characteristics for Desert Sand Particles. Minerals 2022, 12, 581. doi.org/10.3390/min12050581

[2] Hossen, S. K. B; Gallant, A.; Ashraf, Wa. Elemental Testing of Carbonated Silty Sand Treated with Lime. Geo-Congress 2020: Foundations, Soil Improvement, and Erosion.

[3] U.S. Pat. No. 7,753,618.

What is claimed is:

1. A sand aggregate comprising:
plural aggregate grains,
wherein at least one aggregate grain of the plural aggregate grains includes,
desert sand grains that are too small to be used in concrete applications;
carbonate particles distributed on and attached to an external surface of the desert sand grains; and
a sand-based glue that aggregates the desert sand grains having the carbonate particles, to form the at least one aggregate grain,
wherein the at least one aggregate grain has a size comparable to river sand grains, while the desert sand grains have a size smaller than the river sand grains so that the at least one aggregate grain is suitable for concrete applications; and wherein the sand-based glue is obtained from additional desert sand grains treated with a base.

2. The aggregate of claim 1, wherein the base is NaOH.

3. The aggregate of claim 1, wherein the desert sand grains and the additional desert sand grains have a same origin.

4. The aggregate of claim 1, wherein the desert sand grains have an average length less than 1 mm while the river sand grains have an average length larger than 1 mm.

5. The aggregate of claim 1, wherein an average volume and an average surface area of the river sand grain is about 2.17 mm$^3$ and 9.32 mm$^2$, respectively, while for the desert sand grain is about 929.378.2 μm$^3$ and 49,913.6 μm$^2$, respectively.

6. The aggregate of claim 1, wherein an average volume per desert sand grain is smaller than half of an average volume of the river sand grain.

7. The aggregate of claim 6, wherein an average surface area per desert sand grain is smaller than half of an average surface area of the river sand grain.

8. The aggregate of claim 6, wherein an average surface area per desert sand grain is smaller than one fourth of the average surface area of the river sand grain.

9. The aggregate of claim 6, wherein an average surface area per desert sand grain is smaller than one tenth of the average surface area of the river sand grain.

10. The aggregate of claim 1, wherein the carbonate particles include $CaCO_3$.

11. The aggregate of claim 1, wherein the carbonate particles include one of Li, Mg, Zn, Fe, Ba, Sr, or Na.

12. A method for transforming desert sand grains into conforming sand for concrete applications, the method comprising:
    providing the desert sand grains;
    treating the desert sand grains with a carbon dioxide capturing agent to produce enhanced sand grains;
    carbonating the enhanced sand grains to generate carbonate enhanced sand grains and simultaneously storing carbon dioxide on the exterior surface of the carbonate enhanced sand grains, wherein the carbonate enhanced sand grains include carbonate particles attached to an external surface of the desert sand grains; and
    aggregating the carbonate enhanced sand grains with a sand-based glue to form a sand aggregate, which is a conforming sand for concrete applications and has similar sizes as river sand grains, wherein the sand-based glue is obtained from fine desert sand grains treated with a base.

13. The method of claim 12, wherein the desert sand grains are too small to be used in concrete applications.

14. The method of claim 12, further comprising:
    separating the fine desert sand grains from the carbonate enhanced sand grains; and
    treating the separated fine desert sand grains with the base to form the sand-based glue.

15. The method of claim 14, further comprising:
    adding the sand-based glue to the step of aggregating to form the sand aggregate.

16. The method of claim 14, wherein the base is NaOH.

17. The method of claim 12, wherein the desert sand grains have an average length less than 1 mm while the river sand grains have an average length larger than 1 mm.

18. The method of claim 12, wherein an average volume and an average surface area of the river sand grain is about 2.17 mm$^3$ and 9.32 mm$^2$, respectively, while for the desert sand grain is about 929.378.2 μm$^3$ and 49,913.6 μm$^2$, respectively.

19. The method of claim 12, wherein an average volume per desert sand grain is smaller than half of an average volume of the river sand grain.

20. The method of claim 19, wherein an average surface area per desert sand grain is smaller than half of an average surface area of the river sand grain.

21. The method of claim 19, wherein an average surface area per desert sand grain is smaller than one fourth of the average surface area of the river sand grain.

22. The method of claim 19, wherein an average surface area per desert sand grain is smaller than one tenth of the average surface area of the river sand grain.

23. The method of claim 12, wherein the carbonate particles include $CaCO_3$.

24. The method of claim 12, wherein the carbonate particles include one of Li, Mg, Zn, Fe, Ba, Sr, or Na.

\* \* \* \* \*